United States Patent [19]

Feigen et al.

[11] Patent Number: 5,699,513
[45] Date of Patent: Dec. 16, 1997

[54] METHOD FOR SECURE NETWORK ACCESS VIA MESSAGE INTERCEPT

[75] Inventors: Ronald Glen Feigen, Mesa; Paul Aerick Lambert, Scottsdale, both of Ariz.

[73] Assignee: Motorola, Inc., Schaumburg, Ill.

[21] Appl. No.: 414,823

[22] Filed: Mar. 31, 1995

[51] Int. Cl.$^6$ ........................................ G06F 11/00
[52] U.S. Cl. ................ 395/187.01; 395/186; 364/222.5; 364/286.4
[58] Field of Search ............... 395/187.01, 186, 395/188.01; 380/4, 21, 23, 25; 364/286.4, 286.5, 222.5

[56] References Cited

U.S. PATENT DOCUMENTS

| | | | |
|---|---|---|---|
| 4,727,243 | 2/1988 | Savar | 235/377 |
| 4,799,153 | 1/1989 | Hann et al. | 364/200 |
| 5,434,920 | 7/1995 | Cox et al. | 380/49 |
| 5,455,861 | 10/1995 | Faucher et al. | 380/9 |
| 5,499,297 | 3/1996 | Boekert | 380/21 |
| 5,537,099 | 7/1996 | Liang | 340/825.07 |
| 5,560,008 | 9/1996 | Johnson et al. | 395/650 |
| 5,577,209 | 11/1996 | Boyle et al. | 395/200.06 |

*Primary Examiner*—Robert W. Beausoliel, Jr.
*Assistant Examiner*—Dieu-Minh Le
*Attorney, Agent, or Firm*—Jeffrey D. Nehr; Bradley J. Botsch, Sr.

[57] ABSTRACT

Security is provided for an inside network (14) by a security host (26). Connection request messages sent from source hosts (22) in an outside network (12) are intercepted (94) in the security host (26) and prevented from being transmitted on the inside network (14). The user of the source host (22) then establishes a connection (78) to the security host (26) where a dialog session (80, 98, 100) occurs to confirm the user's authenticity and authorization. After the user is confirmed, the intercepted connection request message is released (116) for transmission on the inside network (14) where the intended application service will respond and a communication session will commence.

16 Claims, 4 Drawing Sheets

ACCESS CONTROL LIST

| SOURCE ADDRESS | PORT | DESTINATION ADDRESS | PORT | FLAGS/ PROTO. | ACTION |
|---|---|---|---|---|---|
| (OUTSIDE NET) | * | (OUTSIDE NET) | * | * | BLOCK |
| (INSIDE NET) | * | (OUTSIDE NET) | * | * | PASS |
| SPECIFIED ADDRESS | * | (INSIDE NET) | * | SYNC | FORWARD |
| SPECIFIED ADDRESS | * | (INSIDE NET) | * | NON-SYNC | PASS |
| ⋮ | ⋮ | ⋮ | ⋮ | ⋮ | ⋮ |

METHOD FOR SECURE NETWORK ACCESS VIA MESSAGE INTERCEPT

TECHNICAL FIELD OF THE INVENTION

The present invention relates generally to secure computer networks, to computer network firewalls, and to techniques for providing computer network security.

BACKGROUND OF THE INVENTION

Security for a computer network refers to preventing network users, and particularly undesirable users hereinafter referred to as hackers, from engaging in unwanted activities with respect to computers or peripheral devices on the network. However, computer networks are in place to provide various services for certain authorized users who may need the services. Thus, network security involves an often complicated structure and/or technique for allowing certain users to use certain services while denying services to hackers.

Network security provisions often incorporate a firewall. A firewall is a network node or collection of nodes configured so that all data traffic passing into or out from a protected local network passes through the firewall. Firewalls may be used between a protected local network and an outside network, such as the Internet or the like. Desirably, only authorized data traffic passes through the firewall, and the firewall itself has a low likelihood of being compromised. Firewalls often incorporate one or more filters. Filters selectively block certain classes of data traffic while allowing other classes of data traffic to pass. Filtering decisions are usually based, at least in part, upon packet source and/or destination addresses.

While conventional firewalls provide some degree of security, they often utilize filtering that is much too coarse to distinguish acceptable traffic from hacking. For example, a filter may be programmed to allow traffic between the protected network and a particular remote address. However, this type of programming forms a serious security loophole because any port at the remote address may then be granted access to the protected network.

If the filter is more precisely programmed to permit traffic with only a specific port at the remote address, then otherwise acceptable traffic can be excluded. Acceptable traffic can be excluded because, as is a conventional process in the Internet's TCP/IP protocol, source port numbers are often arbitrarily chosen at the remote address. Even if a single remote host could be identified for favorable treatment by a filter, nothing prevents a hacker from accessing the protected network by gaining physical or logical access to this single favored remote host.

A conventional improved security technique substitutes a proxy between a remote user and one or more local application servers. This improvement may be used either alone or in connection with a firewall. In order to gain access to a local application server, the remote client must first gain authentication and authorization through the proxy. Authentication refers to a process by which a user proves his or her identity. Authorization refers to a process which decides which privileges are given to a presumably authentic user. Improvement results because a specific remote user and not a mere remote host is confirmed. In other words, access is granted based upon authenticating a user and not upon recognizing an identity for certain approved remote equipment. Additional security improvements may accrue from the use of encryption between applications running on the protected network and remote applications. Encryption may be used with or without proxies.

Unfortunately, these conventional security improvements suffer from a limited applicability. An existing infrastructure of server and client applications currently exist. These server and client applications for the most part do not accommodate communication through a proxy or encrypted communications. Consequently, the conventional security improvement techniques cannot be used with the existing infrastructure without significant infrastructure modifications. Such modifications to an entire infrastructure of server and client applications would be such an expensive and time consuming undertaking that such modifications are not practical.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
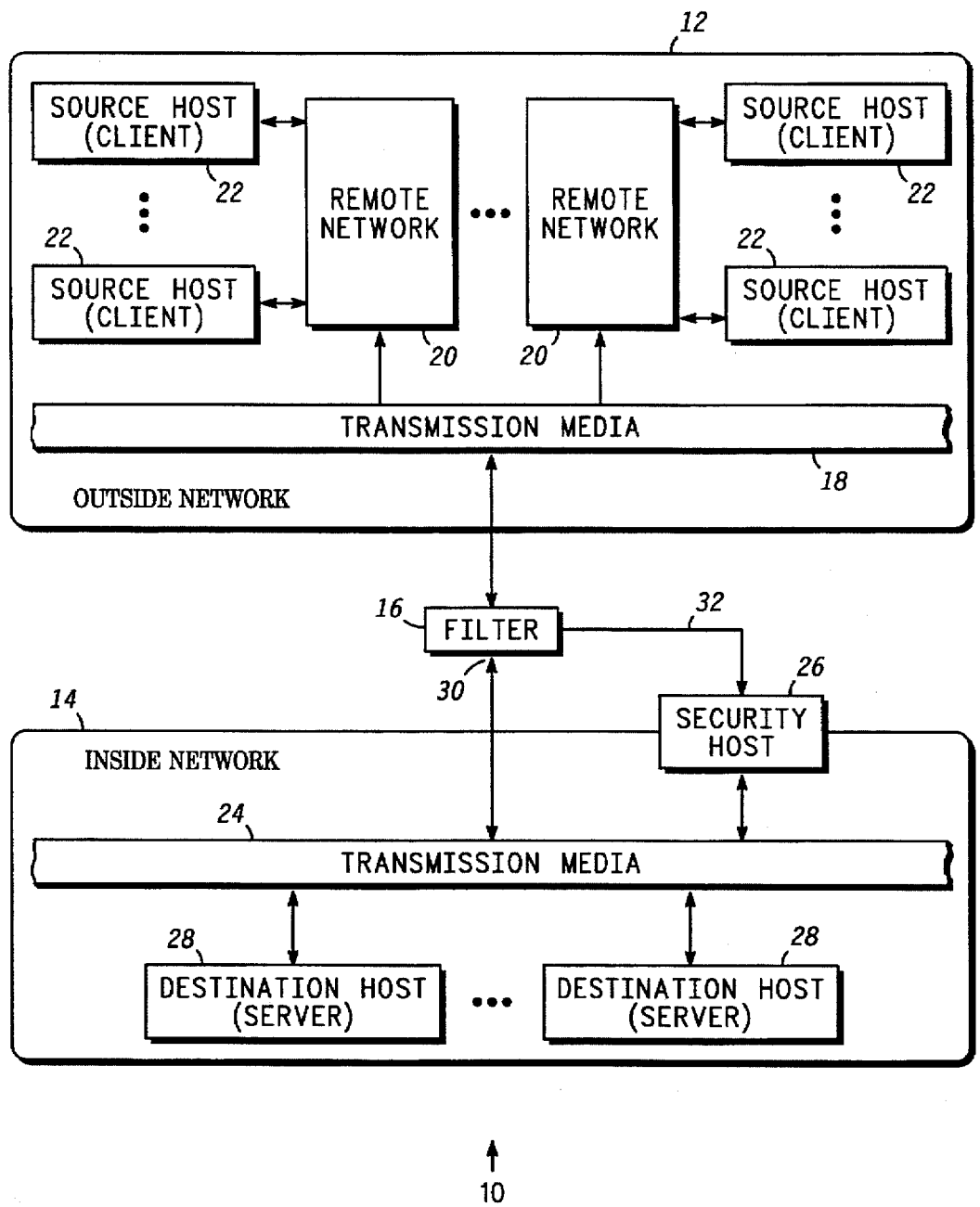
FIG. 1 shows a block diagram of a computer network environment within which the present invention may be practiced.

FIG. 1 shows a block diagram of a computer network environment 10 within which the present invention may be practiced. Environment 10 includes an outside network 12 and an inside network 14. Data traffic may pass between outside and inside networks 12 and 14 if it is allowed through a filter 16.

Outside network 12 represents any system of software and hardware connected in a manner to support data transmission. In the preferred embodiments, outside network 12 is the Internet, and more specifically the TCP/IP connection-oriented protocol suite utilized therewith, but this specific network and protocol is not a requirement of the present invention. Outside network 12 includes various transmission media 18 which couple to any number of remote networks 20. Filter 16 also couples to transmission media 18. Within each remote network 20, any number of source hosts 22 may run any number of client applications that might possibly be used to remotely access services provided elsewhere in environment 10. (Note, the converse function of restricting access from a secure network to unsecured networks can also be controlled with the present method.)

Inside network 14 is also a system of software and hardware connected in a manner to support data transmission. However, inside network 14 is the network for which the preferred embodiments of the present invention provides security. Transmission media 24 of inside network 14 couple to filter 16, a security host 26, and any number of destination hosts 28. A security service runs on security host 26, and any number of application services run on destination hosts 28. Users are persons who operate source hosts 22 in outside network 12 and the client applications running thereon. In accordance with the preferred embodiments of the present invention, only users whose identities are deemed authentic and who are authorized to do so may access application services residing on inside network 14. Filter 16 is desirably provided by a conventional filtering device, such as a router, bridge, gateway, or the like. However, nothing requires the filtering device to function only as a filter. In the preferred embodiment, a main inside port 30 of filter 16 couples to transmission media 24 while a separate logging port 32 directly couples filter 16 to security host 26. In alternative embodiments, security host 26 may be implemented within the same device that implements filter 16 (not shown) or as a separate device placed in series (not shown) between filter 16 and transmission media 24. Thus, for at least certain types of packets, security host 26 resides intermediate to a source host 22 and a destination host 28 within environment 10. Moreover, security host 26 is desirably located physically and logically with inside network 14 where it is beyond the control of source hosts 22. As discussed below, security host 26 and the security service which runs thereon provide transparent session control for inside network 14 at the IP layer of the TCP/IP protocol suite. Due to operation at the IP layer, the existing TCP/IP protocol suite, existing client applications, and existing server applications are all accommodated without modification.

Figures 2, 3:
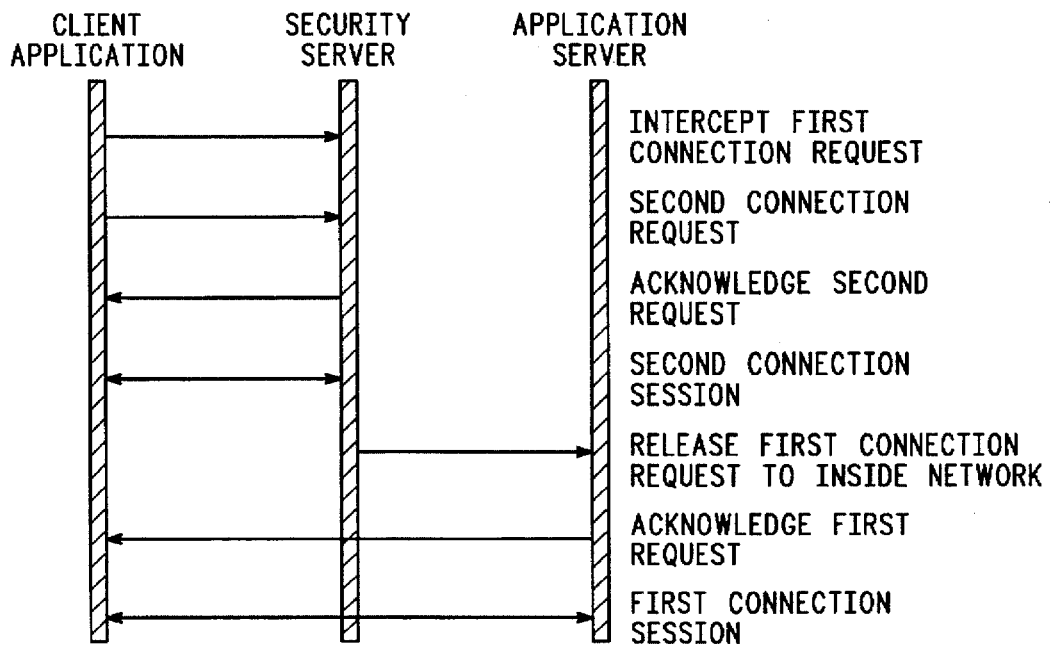
FIG. 2 shows an exemplary access control list which controls the operation of a filter.
FIG. 3 shows a sequence of events which take place in a successful remote access session to an application server located on an internal network.

FIG. 2 shows an exemplary access control list (ACL) 34 which controls the operation of filter 16. ACL 34 represents a table stored in memory (not shown) of the node that implements filter 16. Generally, ACL 34 associates various items which are typically included with message control data in IP and other packet headers. These message or packet control data items are associated with actions that filter 16 may take.

For example, a TCP/IP packet typically specifies a source address 36, a source port 38, a destination address 40, a destination port 42, and various flags/protocols 44 which, among other things, serve to identify a packet type. Action 46 defines the operation of filter 16 when data items 36, 38, 40, 42, and 44 from a packet header define the specified conditions.

As shown at an entry 48, when a packer's source and destination addresses indicate an entities in outside network 12, filter 16 may be programmed to block the packet so that it cannot enter inside network 14. An entry 50 indicates that packets having a source address associated with inside network 14 and a destination address associated with outside network 12 may pass through filter 16. An entry 52 indicates that connection request packets with a specified outside source address and an inside network 14 address are forwarded to logging port 32 (see FIG. 1). In accordance with TCP/IP terminology, a connection request message or packet is called a sync packet. An entry 54 indicates that other types of packets with a specified outside source address and an inside network 14 address are passed through filter 16.

Those skilled in the art will understand that the specific programming of ACL 34 will differ from one inside network 14 to another inside network 14. Moreover, in alternate embodiments, the security service can be involved in dynamically programming ACL 34 to further restrict the passage of unwanted packets into inside network 14. For the purposes of the preferred embodiment, it is the forwarding of potentially permissible connection request messages to logging port 32 (see FIG. 1) and security host 26 (see FIG. 1) that allows a security service to transparently provide security for inside network 14, as discussed below.

Figure 4:
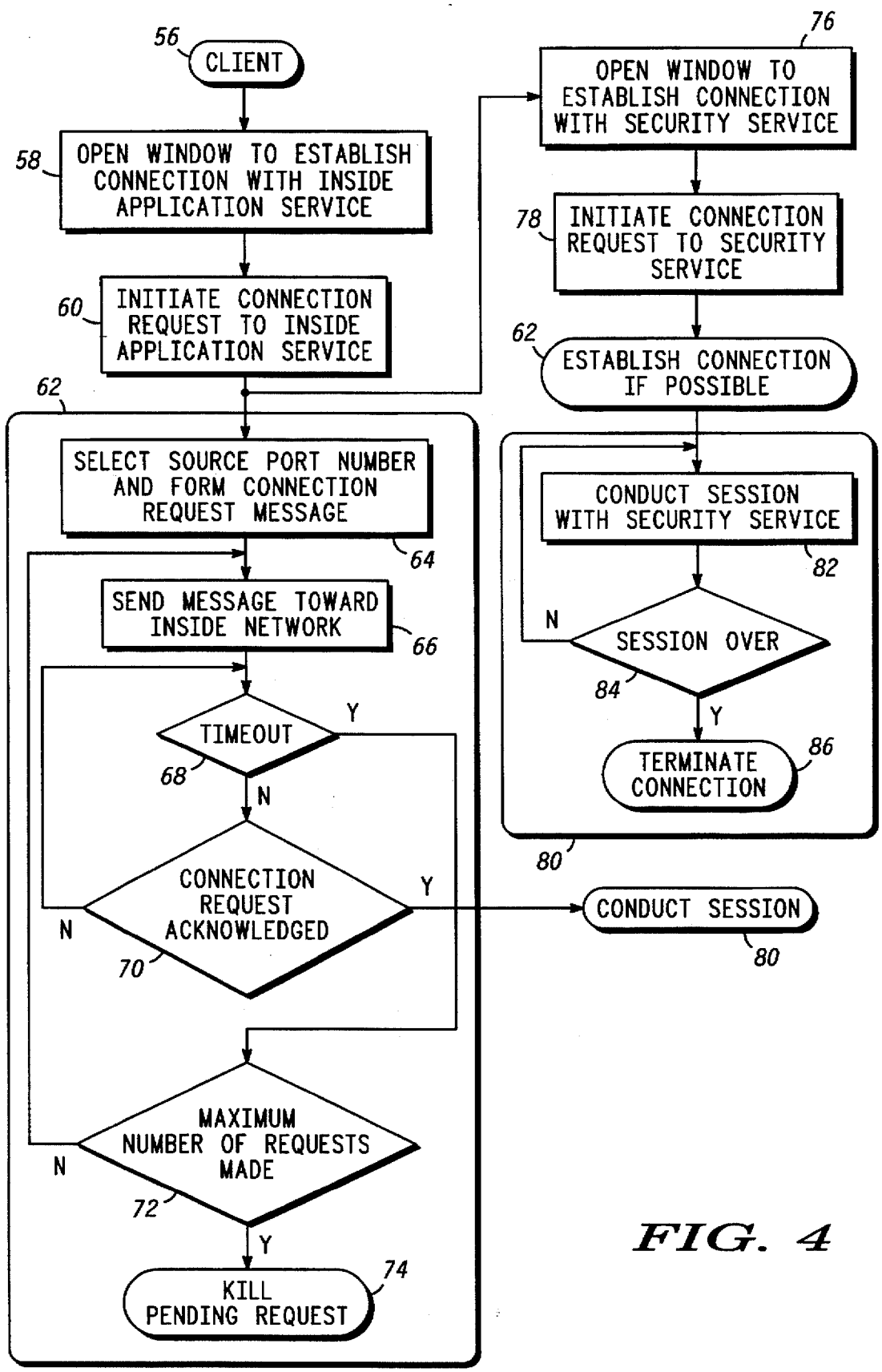
FIG. 4 shows a flow chart of a client process performed in cooperation with a security host process.
Figure 5:
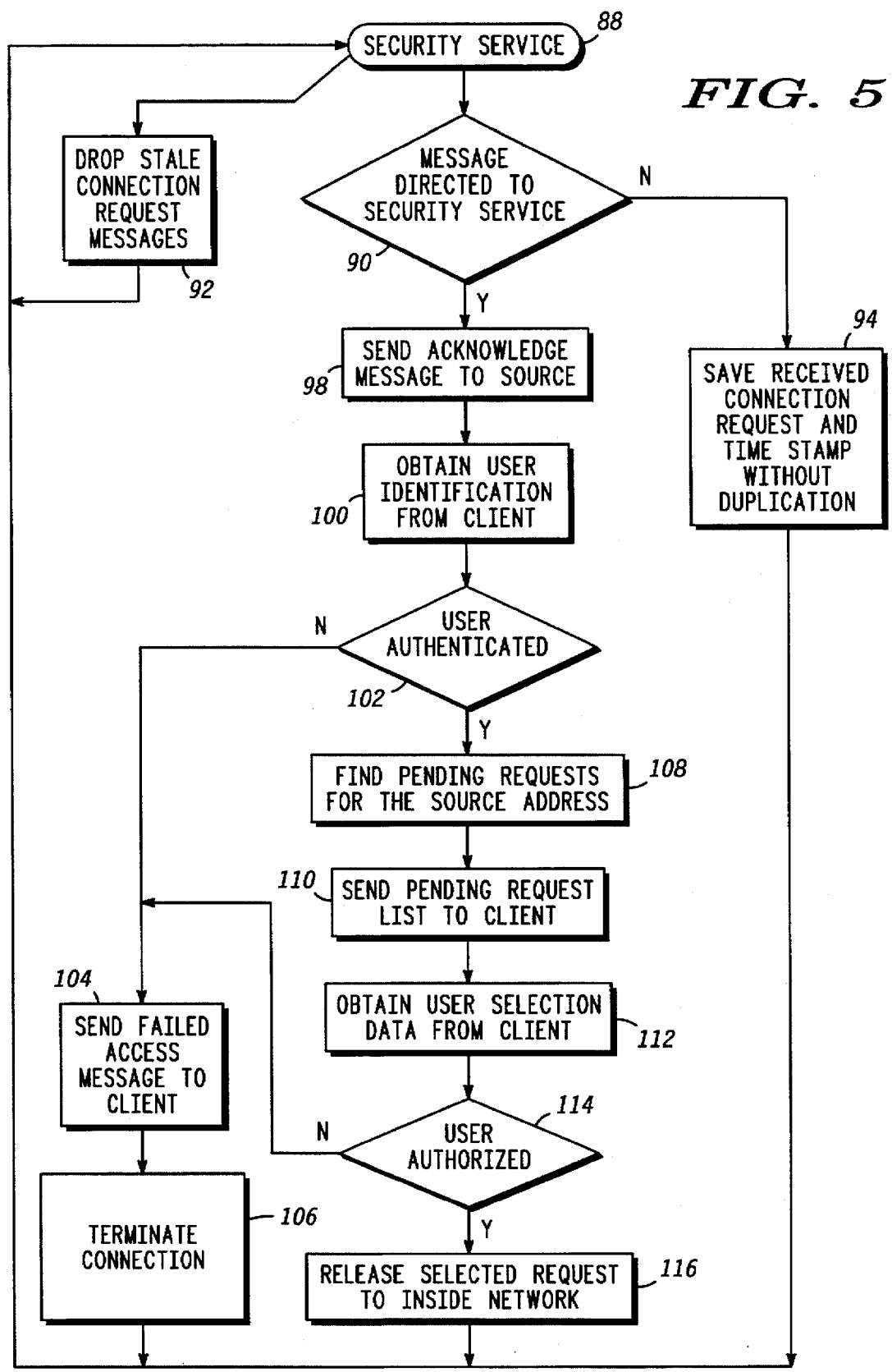
FIG. 5 shows a flow chart of the security host process.

FIG. 3 shows an overview of a sequence of events which take place in a successful remote access session to an application server running on a destination host 28 located on internal network 14. FIGS. 4 and 5 discuss these events in greater detail. Referring to FIGS. 1 and 3, a client application running on a source host 22 sends a first connection request message toward an application service which resides on inside network 14. However, filter 16 routes this first connection request to security host 26, where a security service prevents it from being transmitted within inside network 14. The security service saves this first connection request but does not return an acknowledgment to the client application.

Next, the source host 22 sends a second connection request message toward inside network 14, but this second message requests connection to the security service. Filter 16 may be programmed either to forward this second connection request message through logging port 32 or to let this particular connection request message pass through to inside network 14.

The security service acknowledges the second connection request, and a communication session dialog between the source host 22 and the security service occurs through this second connection. During this session, the first connection request is confirmed by authenticating and authorizing the user who is operating the source host 22. After confirmation, this second connection may be terminated. The security service then releases the first connection request to inside network 14. The intended target application service located at a destination host 28 will then acknowledge the connection request, and a communication session based upon the first connection will commence.

FIG. 4 shows a flow chart of a client process 56 performed in cooperation with a security host process, discussed below in connection with FIG. 5. Client process 56 is performed at a source host 22 in outside network 12 (see FIG. 1). As shown by dotted-line boxes, process 56 includes various tasks which are intended, but not required, to be performed in response to actions taken by a user.

A user task 58 is performed to open a window within which a connection may be established with an application service on inside network 14. After the user opens this window, a task 60 is performed to initiate a connection request to the inside application service. Desirably, conventional techniques and processes are used in tasks 58 and 60. Thus, security provisions provided through the operation of security host 26 are transparent to existing client applications. In other words, the user may use any client application to perform tasks 58 and 60 which would be compatible with the intended application server if the security provisions provided by security host 26 were not present.

After task 60, and while additional user actions occur (discussed below), the source host 22 performs a process 62 to establish a connection, if possible, with the target application server located on inside network 14. Process 62 includes a task 64 to select a source port number which is compatible with the TCP protocol. Task 64 may arbitrarily select the source port number. In addition, task 64 forms a connection request message, which is a legitimate sync packet in the TCP/IP protocol suite. This message specifies a source address for the remote network 20 (see FIG. 1) upon which source host 22 is located, a destination address which corresponds to inside network 14, a port number associated with the application service to which connection is being requested, and control data which define the message as a connection request message.

Next, a task 66 sends the connection request message through transmission media 18 (see FIG. 1) toward inside network 14. After task 66, a query task 68 determines whether a time-out period following task 66 has expired. So long as the time-out period has not yet expired, a query task 70 determines whether the connection request has been acknowledged. As discussed above in connection with FIG. 3, this first connection request message is intercepted at security host 26 (see FIG. 1) and does not immediately reach its intended destination. Thus, the connection request for the first message will not be immediately acknowledged. When no acknowledgment is detected at task 70, program control loops back to task 68 to again test for a time-out.

Due to the interception of the first connection request message at security host 26, the time-out period is expected to, but need not, expire at least once. When this happens, a query task 72 determines whether a maximum predetermined number of connection request retransmissions has been made. So long as this maximum number has not been reached, program control loops back to task 66 to again send the first connection request message toward inside network 14. If no acknowledgment of the first connection request message is received by the time that the maximum number of retransmissions occurs, a process 74 will be performed to kill the pending connection request. User actions will be required to attempt the connection again.

While source host 22 is performing process 62, user actions are simultaneously causing source host 22 to perform a user task 76 and subsequent tasks. During task 76, the user opens a window within which a connection may be established with the security service running on security host 26. After the user opens this window, a task 78 is performed to initiate a second connection request to the security service. Desirably, conventional techniques and processes, such as Telnet, are used in tasks 76 and 78.

After task 78, process 62 is again performed to establish a connection if possible, but this time process 62 is performed in connection with the second connection request rather than the first. As discussed above in connection with FIG. 3, the second connection request is acknowledged immediately by the security service. Thus, program control quickly proceeds through this iteration of process 62 to a conduct session process 80 while the source host 22 continues to perform process 62 in connection with the first connection request.

During process 80, a task 82 is performed to conduct a portion of the communication session with the security service. In particular, this second connection session engages in a dialog with the user, which is discussed below in connection with FIG. 5. After task 82, a query task 84 determines whether the session has ended. So long as the session has not ended, program control loops back to task 82 to continue this second connection session.

When the session is over, a process 86 is performed to terminate the connection. Assuming that the user is authenticated and authorized, the security service will release the first connection request it has intercepted within inside network 14, and the first connection request will be acknowledged by the intended destination of the first connection request.

When this acknowledgment is received at source host 22, task 70 routes program control out from process 62 relative to the first connection request to conduct session process 80. During this iteration of process 80, the user and client application will have access to the application service provided on inside network 14. If the user is not authenticated or authorized or if too much time is consumed in the dialog session with the security service, no access to the application service will be granted, and process 62 relative to the first connection request will eventually kill the pending first connection request at process 74.

FIG. 5 shows a flow chart of a security service process 88 which runs on security host 26. When a connection request message is received at security host 26, process 88 leaves an idle state and performs a query task 90. From time to time, process 88 also leaves the idle state and performs a task 92, which is discussed below. Task 92 may be performed simultaneously with and independent from other tasks in process 88.

Query task 90 determines whether the received connection request message is directed to the security service or to some other application service on inside network 14. When the received connection request message is directed to another application service and not to the security service, a task 94 saves the received connection request with a current time stamp.

In addition, task 94 saves the received connection request so that duplicate connection requests are eliminated. Duplicates may, for example, be eliminated by saving connection request messages in an ordered list so that subsequent requests for the same connection over write their predecessors. The elimination of duplicate connection request messages prevents retransmissions of connection requests discussed above in connection with FIG. 4 from being recognized as separate connection requests.

After task 96, program control returns to the idle state. Over a period of time, any number of connection requests may be intercepted through tasks 94 and 96. However, some of the connection requests may be dropped, erased, or otherwise removed from consideration through the action of task 92.

Process 88 performs task 92 from time to time to identify and drop stale connection request messages. Stale connection request messages are associated with time stamps indicating that a predetermined period of time has elapsed since they were intercepted. Thus, if a connection request is not acted upon within the predetermined period of time, it will be dropped so that it cannot later serve as the basis of a connection to an inside application service. After each iteration of task 92, program control returns to the idle state.

When task 90 identifies a connection request message directed to the security service, a task 98 sends the appropriate acknowledgment message to the source address and port number indicated in the connection request message. This causes the second connection communication session, discussed above in connection with FIGS. 3 and 4, to commence. During this second connection session, at a task 100 process 88 sends an appropriate prompting message to the source to elicit user identification data from the client application, and waits until such data are obtained. Of course, conventional time-out techniques (not shown) may be used to address the lack of a response.

After task 100, a query task 102 authenticates the user. In other words, task 102 determines whether the user identification obtained above in task 100 indicates that the user is an authentic user or a hacker. Together tasks 100 and 102 form an authentication process the strength of which may vary in accordance with the needs of network 14. In the preferred embodiment, a one-time password process is recommended. A one-time password process requires a user to have an authenticator device which provides the one-time passwords that a user may enter and may be confirmed in task 102. However, different systems may use different authentication processes.

When task 102 fails to confirm the user's authenticity, a task 104 is performed to send an appropriate failed access message to the client. Next, a task 106 takes any actions needed to continue to prevent requests associated with the user's source host 22 from being released onto inside network 14. Thus, no connection will be made with the intended destination. Eventually, the user's first connection request will be dropped through the action of task 92. After task 106, program control returns to the idle state.

When task 102 confirms the user's authenticity, a task 108 investigates the currently pending intercepted connection request messages to identify those messages having the same source address as the source address used in the current session with the security service. Typically, only one connection request will be pending because connection requests are intercepted for only a short period of time before being dropped by task 92. However, multiple connection requests may be pending for several different reasons. For example, the source address may identify a large institution, such as a university, from which multiple legitimate simultaneous connection requests might possibly originate. In addition, a hacker may be attempting to hijack the connection or the user's own previous connection request may still be intercepted and not dropped via the action of task 92.

Next, a task 110 sends data describing these identified pending requests to the client application, where they are displayed for the user, preferably in the form of a menu. In addition, task 110 sends an appropriate prompting message to the user to elicit a selection of one of the pending connection requests from the user. By reviewing the pending connection requests the user may determine whether suspicious activities are taking place.

After task 110, a task 112 obtains the selection data from the client. These selection data identify one of potentially several connection requests. After task 112, a query task 114 determines whether the presumably authentic user is authorized to access the application service identified by the selection data obtained above in task 112. Task 114 may, for example, consider user privileges with respect to specific application services and/or the time of day. When task 114 fails to confirm the user's authorization for the requested connection, program control proceeds to task 104 to return a failed access message. The requested connection will not occur.

When task 114 confirms that the user is authorized to access the requested application service, a task 116 releases the selected connection request message to inside network 14. As discussed above, the selected application service will then acknowledge the message and a communication session will commence. After task 116, program control returns to the idle state. Eventually, the connection request message for the just-completed connection will be erased from the memory of security host 26 via task 92.

In summary, the present invention provides an improved method and apparatus for providing security for a communication network. The present invention provides network security which can achieve user authentication while remaining compatible with an existing infrastructure of server and client applications. Unconfirmed connections are prevented from being established. In the preferred embodiment, communication session control is provided at the IP level of the TCP/IP protocol suite used by the Internet, and the session control is transparent at TCP and application levels. The present invention may be implemented in a relatively simple configuration of hardware and software at relatively low cost.

The present invention has been described above with reference to preferred embodiments. However, those skilled in the art will recognize that changes and modifications may be made in these preferred embodiments without departing from the scope of the present invention. For example, those skilled in the art will appreciate that the precise processes, task descriptions, and sequences described herein may be greatly modified from implementation to implementation. These and other changes and modifications which are obvious to those skilled in the art are intended to be included within the scope of the present invention.

What is claimed is:

1. A method of providing security for a network having one or more application services to which connections may be made from outside said network, said method comprising the steps of:
   intercepting a plurality of connection request messages each of which establishes a first connection request for an application service provided on said network;
   establishing a second connection, said second connection being established with a security service;
   confirming, through said second connection, said first connection request;
   transmitting a message on said network after said confirming step confirms said first connection request;
   establishing said second connection with a source hose having a source host address;
   sending data describing ones of said intercepted connection request messages which originated from said source host address to said source host through said second connection; and
   receiving selection data from said source host through said second connection, said selection data identifying a selected one of intercepted connection request messages wherein said message transmitted by said transmitting step corresponds to said selected one of intercepted connection request messages.

2. A method as claimed in claim 1 wherein said intercepting, establishing, confirming, and transmitting steps comprise the step of intercepting, establishing, confirming, and transmitting by a security host residing on said network.

3. A method as claimed in claim 1 wherein said intercepting step comprises the step of saving said connection request message.

4. A method as claimed in claim 3 wherein said saving step comprises the step of eliminating duplicate connection request messages.

5. A method as claimed in claim 1 wherein said intercepting step comprises the step of preventing said connection request message from being transmitted on said network.

6. A method as claimed in claim 1 wherein said establishing step comprises the steps of:
   receiving a second connection request message, said second connection request message identifying a source which originated said second connection request message, and said second connection request message requesting establishment of a connection to said security service; and
   sending an acknowledgment message from said security service to said source.

7. A method as claimed in claim 1 wherein:
   said connection request message originates in response to actions taken by a user at a source host; and
   said confirming step comprises the step of authenticating said user.

8. A method as claimed in claim 1 wherein:

said connection request message originates in response to actions taken by a user at a source host; and said confirming step comprises the, step of authorizing said user.

9. A method as claimed in claim 1 wherein said intercepting step intercepts a plurality of connection request messages each of which requests establishment of a connection to an application service provided on said network, and said method additionally comprises the steps of:

identifying ones of said plurality of connection request messages which are not confirmed within a predetermined period of time following their interception; and dropping said ones of said plurality of connection request messages.

10. A method as claimed in claim 1 additionally comprising the step of preventing said message from being transmitted on said network when said confirming step fails to confirm said first connection request.

11. A method of providing security for a network having one or more application services to which connections may be made from outside said network, said method comprising the steps of:

receiving a connection request message at a security host coupled to said network, said connection request message providing a first connection request to an application service provided on said network whereby said connection request message is originated in response to actions taken by a user at a source host;

establishing a second connection at said security host;

confirming, through said second connection, said first connection request thereby authenticating a user;

preventing, prior to said confirming step, said connection request message from being transmitted on said network; and transmitting said connection request message on said network after said confirming step confirms said first connection request.

12. A method as claimed in claim 11 additionally comprising the step of preventing said connection request message from being transmitted on said network when said confirming step fails to confirm said first connection request.

13. A method of providing security for a network having an application service to which a connection may be established from outside said network, said connection being initiated through actions taken by a user at a source host having a source host address, and said method comprising the steps of:

intercepting a plurality of connection request messages from said source host, each of said connection request messages requesting establishment of a first connection to said application service provided on said network;

establishing a connection between said source host and a security service;

authenticating said user through said connection between said source host and said security service; and transmitting said connection request message on said network after said authenticating step authenticates said user;

sending data describing ones of intercepted connection request messages which originated from said source host address to said source host through said connection between said source host and said security service; and receiving selection data from said source host through said connection between said source host and said security service, said selection data identifying a selected one of said intercepted connection request messages, wherein said message transmitted by said transmitting step corresponds to said selected one of said intercepted connection request messages.

14. A method as claimed in claim 13 additionally comprising the step of preventing, prior to said authenticating step, said connection request message from being transmitted on said network.

15. A method as claimed in claim 13 wherein said intercepting step intercepts a plurality of connection request messages each of which requests establishment of a connection to an application service provided on said network, and said method additionally comprises the steps of:

identifying ones of said plurality of connection request messages which are not confirmed within a predetermined period of time following their interception; and dropping said connection request messages identified in said identifying step.

16. A method as claimed in claim 13 additionally comprising, prior to said transmitting step, the step of authorizing said user for said application service.

* * * * *